Nov. 16, 1965    R. M. DE DOBBELAERE ETAL    3,217,382
HIGH SPEED ROTARY FILE
Filed Jan. 13, 1964

INVENTORS
Robert M. DeDobbelaere
BY Marvin Stahl
Louis Bennet Att'y 3,217,382
HIGH SPEED ROTARY FILE
Robert M. De Dobbelaere and Marvin Stahl, Elgin, Ill., assignors, by mesne assignments, to Illinois Tool Works Inc., Chicago, Ill., a corporation of Delaware
Filed Jan. 13, 1964, Ser. No. 337,485
3 Claims. (Cl. 29—78)

This invention relates to a rotary file of the burr type, such as is used for the cutting of materials such as aluminum, stainless steel, copper, brass and plastics, and has as its principal object the provision that the flutes of the burr will not load up with material whereby the rotary burr will no longer cut and machine.

An important object of the invention is to provide a rotary file having fast spiral flutes that will not load up with material.

Another object of the invention is to provide a rotary file that will allow the attainment of an exceptional high cutting speed and remain air cooled during the operation.

Still another object of the invention is to provide a rotary file that will produce a superior finish to the material to be cut due to the continued shearing action created by the unique fast spiral flute configuration which tends to eliminate chatter in the rotary file tool thereby producing a precise dimension or cut.

Still another object of the invention is to provide a rotary file which will utilize a minimum amount of power in order to allow the rotary file to cut faster at the exceptionally high cutting edge peripheral speeds.

These and other objects of the invention, which will become apparent as the detailed configuration is described, are attained by the design due to the unique spiral helix angle of the flutes, namely 50 to 55 degrees combined with a positive radial rake angle of between 0 to 10 degrees. By adopting a plurality of sharp spiral flutes inscribed on the body of the rotary file describing a helix angle of approximately 50 degrees in combination with a positive radial rake angle which defines the cutting edge, the metal cutting operation of the burr at extremely high speeds of approximately 20,000 to 40,000 r.p.m. precisely removes optimum amounts of material under air cooling.

A conventional rotary file of about one-half inch in body diameter generally has approximately 25 to 35 standard flutes with negative rake angle cutting edges and a helix angle of about 15 to 30 degrees. It has been found that this conventional file design will load up the flutes with material when cutting such materials as aluminum, stainless steel, copper, brass, plastics and the like. When the flutes load up with material, the rotary file will no longer cut, and the file must be sent to the factory for resharpening. When the flutes load up with metallic material, galling incurs and develops an unsatisfactory condition on the cutting edge and flute surfaces due to the excessive friction whereby localized welding occurs with subsequent spalling and roughening of the cutting surface. The rotary file cutting surfaces are generally made of tungsten carbide or high-speed steels and resharpening of these tough materials is extremely expensive. Continuous resharpening ultimately reduces the efficiency of the rotary file.

The invention may be better understood from the following detailed description of an illustrative embodiment thereof, taken in connection with the accompanying drawing, in which FIGURE 1 illustrates in perspective a plain cylindrical rotary file or burr defining a right-hand spiral;

Figure 1:
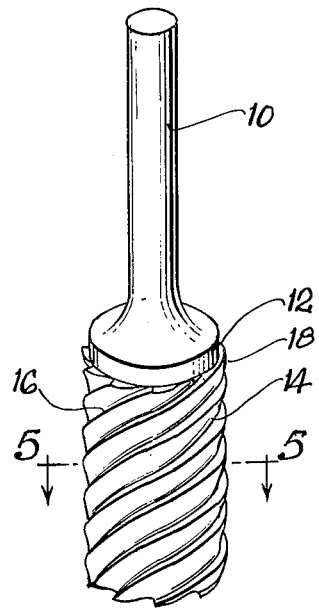

Referring now to FIGURE 1, the shank 10 is that portion between the back end of the body 12 of the flutes 14 and the back end of the burr, exclusive of any neck, recess or guide. There are numerous types of shanks such as straight, squared or tapered shank. The burr is a rotary cutting tool, generally of cylindrical or conical shape. It is usually equipped with a plurality of peripheral grooves or flutes 14 either in right-hand or left-hand helix as required. The flutes 14 form cutting teeth or cutting edges 16 as well as grooves for accommodating the chips removed. In describing a burr there is a certain nomenclature which is used to illustrate the dimensional configuration of the burr. The overall length is the extreme length measured parallel to the axis of the complete burr from end to end, the flute length is the cutting length of the flutes and the land 18 is the peripheral of that portion of the flute length which is not cut away by the flutes. The land width is the distance in the diametral plane between the cutting edge 16 and the heel. The cutting edge 16 is the leading edge of the heel. The heel is the following edge of the land 18; and the core diameter or body diameter is the diameter of the large cylinder which would not project into the flutes. The flute is that portion of the burr which is cut away between the lands. These flutes are generally helical in configuration defining a helix angle. The helical flutes, sometimes called "spirals", are where the grooves and the lands form a helical path around the axis of the burr or rotary file. The helix angle is the angle made by the leading edge of the lands with the axis of the rotary file.

Rotary files usually embody a plurality of even number of flutes. These flutes may either be right or left hand. In determining the number of flutes in the rotary file, it is important that the flutes are wide and deep enough to accommodate the small chips when cutting. Furthermore, the lands should be large enough to prevent deflection back of the cutting edges and of sufficiently large sections to contain enough material to dissipate adequately the heat generated at the cutting edge 16. Practically all the cutting done by the rotary file is accomplished by the sidewise cutting action of the cutting edge.

Figure 6:
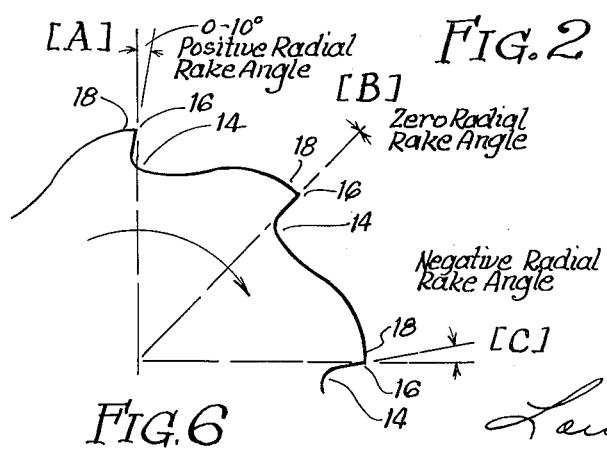
FIGURE 6 is an enlarged schematic drawing showing a burr or rotary file describing the three types of radial rake angles, namely, a positive radial rake angle, a zero rake angle and the non-acceptable negative radial rake angle.

The cutting edge 16 is shaped so as to possess a positive radial rake angle from about 0 to 10 degrees as shown by letters A and B in FIGURE 6. A negative radial rake angle requires considerably more pressure to feed the tool into the work. Owing to this additional pressure, there is a tendency for the burr to jump ahead, when easier cutting is encountered. Therefore, a negative rake angle as shown as letter C, at the cutting edge 16 is not acceptable to the positive rake angle as shown at letters B and A.

With reference to the flute configuration of a burr, it has been found that the following formula is used to determine the number of flutes or cutting edges:

$$T = \frac{D}{\frac{1}{16}} \pm 2$$

Where
T is equal to the number of flutes on the rotary file; and
D is the core or cylinder diameter of the rotary file.

Utilizing this formula, a burr or rotary file will possess approximately eight flutes for a half-inch diameter rotary file.

It has been found that an even number of flutes is preferable. Furthermore, we have found that in order to manufacture the burr or rotary file the proper pitch or helix angle of the cutting edge is extremely important. The formula for determining the proper pitch is as follows:

$$P = \pi D \cot A$$

Where
P is the pitch or lead of the cutting edges;
D is the diameter of the rotary file; and
A is equivalent approximately to an angle of about 50 degrees.

We have found that there may be a slight variation in the pitch or helix angle and this may vary between plus or minus 5 degrees. Experimentally, the variations in helix angles have been extended through the range of 45 degrees to 65 degrees. Reasonable results were obtained over the range utilizing the wider variation of helix angle; however, the preferred range is between 45 and 55 degrees.

The rotary file may also assume other contours other than the cylindrical configuration as illustrated in the drawings. These configurations may be defined as the tree-radius end burr, the egg burr, the taper-radius end burr, the cylindrical-ball nose burr, the cone burr, the ball burr, and the tree-pointed end burr.

Figures 2, 3, 4:
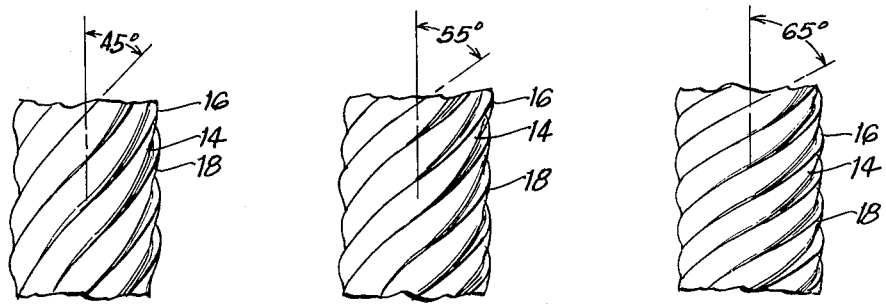
FIGURE 2 shows a portion of the burr body illustrating in perspective a helical flute angle of approximately 55 degrees.
FIGURE 3 shows a portion of the burr body illustrating in perspective a helical flute angle of approximately 45 degrees which is the lower limit of the sharp spiral flute angle.
FIGURE 4 shows a portion of the burr body illustrating in perspective a helical flute angle of approximately 65 degrees which is the maximum spiral flute angle which can be tolerated.
Figure 5:
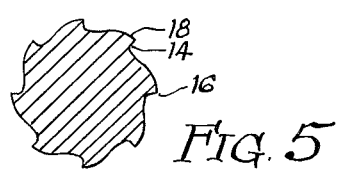
FIGURE 5 is a cross section taken along line 5—5 of FIGURE 1, illustrating the positive radial rake angle of the cutting edge.

FIGURES 2, 3 and 4 generally illustrate the pitch or helix angles of the flutes ranging for 45 degrees, 55 degrees and 65 degrees, respectively. FIGURE 5 is a cross section of the cylinder body 12 of the rotary file illustrating the symmetrical arrangement of the cutting edges 16 and the flutes 14.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States is:

1. A high speed rotary file comprising
   a shank,
   a body of substantially circular cross-section normal to the axis and having a plurality of peripherally disposed helical lands and grooves running the length of said body, the number of said helical lands being a whole number approximately equal to the diameter in inches of the circular cross-section multiplied by 16,
   said helical lands making an angle of from 45 to 65 degrees with a plane containing the axis of said body and presenting cutting edges at their periphery.
2. A high speed rotary file according to claim 1 having a cutting edge positioned at the leading edge of each land portion describing a positive radial rake angle.
3. A high speed rotary file according to claim 1 in which said body is tungsten carbide.

References Cited by the Examiner

UNITED STATES PATENTS

| | | | |
|---|---|---|---|
| 1,881,705 | 10/1932 | Lapointe | 29—78 X |
| 2,367,597 | 6/1945 | Melbourne | 29—78 |
| 3,058,199 | 10/1962 | Cave | 29—78 X |

FOREIGN PATENTS

| | | |
|---|---|---|
| 541,218 | 4/1922 | France. |
| 932,572 | 7/1963 | Great Britain. |

WILLIAM W. DYER, JR., *Primary Examiner.*